US010622853B2

(12) United States Patent
Toda et al.

(10) Patent No.: US 10,622,853 B2
(45) Date of Patent: Apr. 14, 2020

(54) SYNCHRONOUS RELUCTANCE TYPE ROTARY ELECTRIC MACHINE

(71) Applicants: Toshiba Industrial Products and Systems Corporation, Kawasaki-shi (JP); Toshiba Infrastructure Systems & Solutions Corporation, Kawasaki-shi (JP)

(72) Inventors: Kazuhiro Toda, Mie-gun (JP); Takashi Araki, Mie-gun (JP); Masaaki Matsumoto, Mie-gun (JP); Katsutoku Takeuchi, Kokubunji (JP); Makoto Matsushita, Fuchu (JP); Toshio Hasebe, Hachioji (JP)

(73) Assignees: Toshiba Industrial Products and Systems Corporation, Kawasaki-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/373,679

(22) Filed: Apr. 3, 2019

(65) Prior Publication Data

US 2019/0229568 A1    Jul. 25, 2019

Related U.S. Application Data

(63) Continuation of application No. PCT/JP2017/036312, filed on Oct. 5, 2017.

(30) Foreign Application Priority Data

Oct. 7, 2016 (JP) ................................. 2016-199227

(51) Int. Cl.
*H02K 19/14* (2006.01)
*H02K 1/27* (2006.01)
(Continued)

(52) U.S. Cl.
CPC ............ *H02K 1/276* (2013.01); *H02K 1/246* (2013.01); *H02K 19/10* (2013.01); *H02K 19/24* (2013.01);
(Continued)

(58) Field of Classification Search
CPC .......... H02K 1/246; H02K 1/276; H02K 1/46; H02K 19/14; H02K 1/2766; H02K 17/165; H02K 2213/03
See application file for complete search history.

(56) References Cited

U.S. PATENT DOCUMENTS 2,913,607 A * 11/1959 Douglas ................. H02K 19/14
310/216.107
2,975,310 A * 3/1961 Armstrong ............. H02K 19/14
310/163
(Continued)

FOREIGN PATENT DOCUMENTS

| DE | 10 2005 062 922 A1 | 7/2007 |
|---|---|---|
| JP | 2003-009484 | 1/2003 |
| JP | 2016-507207 | 3/2016 |

OTHER PUBLICATIONS

International Search Report dated Dec. 26, 2017 in PCT/JP2017/036312, filed on Oct. 5, 2017 (with English Translation).

*Primary Examiner* — Dang D Le
(74) *Attorney, Agent, or Firm* — Oblon, McClelland, Maier & Neustadt, L.L.P.

(57) ABSTRACT

A synchronous reluctance type rotary electric machine of an embodiment includes, a rotor core, a plurality of conductor bars, short-circuit rings, a stator core, and multiphase armature windings. The rotor core includes multi-layered hollow parts having a convex shape toward a side radially inward formed for each pole in cross section, and a bridge formed between each of the hollow parts and an outer circumferential surface thereof. The plurality of conductor bars are
(Continued)

disposed in the respective hollow parts. The short-circuit rings connect the plurality of conductor bars together. Then, in all of the hollow parts of a second layer and subsequent layers other than the hollow part of a first layer which is at a position farthest from the rotation axis of the rotor core, the conductor bars are disposed at both end portions thereof close to the bridge at a predetermined distance from the bridge.

2 Claims, 5 Drawing Sheets

(51) Int. Cl.
    *H02K 23/40*     (2006.01)
    *H02K 19/10*     (2006.01)
    *H02K 1/24*     (2006.01)
    *H02K 19/24*     (2006.01)

(52) U.S. Cl.
    CPC ....... *H02K 23/405* (2013.01); *H02K 2213/03* (2013.01)

(56) References Cited

U.S. PATENT DOCUMENTS

| | | | | |
|---|---|---|---|---|
| 4,922,152 | A | * | 5/1990 | Gleghorn ............ H02K 1/2766 29/598 |
| 4,924,130 | A | * | 5/1990 | Fratta ................. H02K 1/2766 310/156.53 |
| 6,121,706 | A | * | 9/2000 | Nashiki ............... H02K 1/246 310/152 |
| 2006/0108888 | A1 | | 5/2006 | Jung et al. |
| 2015/0372577 | A1 | | 12/2015 | Haussmann et al. |
| 2018/0166959 | A1 | * | 6/2018 | Finkle .................. H02K 1/223 |

\* cited by examiner

SYNCHRONOUS RELUCTANCE TYPE ROTARY ELECTRIC MACHINE

CROSS-REFERENCE TO RELATED APPLICATIONS

This application is a continuation of International Application No. PCT/JP2017/036312, filed Oct. 5, 2017, which is based upon and claims the benefit of priority from Japanese Patent Application No. 2016-199227, filed on Oct. 7, 2016; the entire contents of which are incorporated herein by reference.

FIELD

Embodiments described herein relate generally to a synchronous reluctance type rotary electric machine.

BACKGROUND

A synchronous reluctance type rotary electric machine includes a rotor and a stator. The rotor includes a shaft rotatably supported and extending in an axial direction at a center of the rotating shaft, and a rotor core externally fitted and fixed to the shaft. The stator includes a stator core disposed on an outer circumference of the rotor core to be spaced apart from the rotor core and having a plurality of teeth disposed at intervals in a circumferential direction, and multipole multiphase armature windings respectively wound around the plurality of teeth.

Multi-layered hollow parts having a convex shape toward the side radially inward are formed for each pole in the rotor core. When the hollow parts are formed in this manner, a direction in which magnetic flux easily flows and a direction in which magnetic flux does not easily flow are formed in the rotor core. Thus, the synchronous reluctance type rotary electric machine rotates the shaft using a reluctance torque generated by the hollow parts.

Incidentally, at the time of starting a synchronous reluctance type rotary electric machine, it is necessary to detect a relative position between the stator core and the rotor core and to supply electric power to predetermined armature windings on the basis of the relative position. Therefore, an inverter is required to start the synchronous reluctance type rotary electric machine, which may increase the costs of the synchronous reluctance type rotary electric machine.

Thus, in order to start the synchronous reluctance type rotary electric machine without using an inverter, a so-called self-starting type synchronous reluctance type rotary electric machine in which a nonmagnetic conductor is provided in the hollow parts to generate an induced torque has been proposed.

Here, in order to reduce leakage magnetic flux at an outer circumferential portion of the rotor core, the hollow parts are formed as close as possible to the outer circumferential surface of the rotor core. Therefore, for example, when an end portion on the outer circumferential surface side of the rotor core in the hollow part is filled with a conductor, since the magnetic flux pulsating according to a pitch of teeth of the stator links with the conductor, a harmonic current that does not contribute to rotation of the rotor flows through the conductor. Since this harmonic current is converted into Joule heat, there is a likelihood of the efficiency of the synchronous reluctance type rotary electric machine decreasing according to that amount.

Also, the magnetic flux flowing through the rotor core decreases in magnetic flux density toward a radial center of the rotor core. Therefore, for example, when the entire hollow part is filled with a conductor, there may be a portion that hardly contributes to the induced torque in the conductors. Therefore, the weight of the rotor core is unnecessarily increased, and thereby there is a likelihood of not only increasing manufacturing costs but also decreasing efficiency of the synchronous reluctance type rotary electric machine.

DETAILED DESCRIPTION

A synchronous reluctance type rotary electric machine of an embodiment includes, a rotor core, a plurality of conductor bars, short-circuit rings, a stator core, and multiphase armature windings. The rotor core is provided to be rotatable around a rotation axis, and includes multi-layered hollow parts having a convex shape toward a side radially inward formed for each pole in cross section, and a bridge formed between each of the hollow parts and an outer circumferential surface thereof. The plurality of conductor bars are disposed in the respective hollow parts and extend in an axial direction and over approximately entire length of the rotor core. The short-circuit rings are provided at both ends of each of the plurality of conductor bars and connect the plurality of conductor bars together. The stator core is disposed on an outer circumference of the rotor core to be spaced apart from the rotor core and includes a plurality of teeth disposed at intervals in a circumferential direction. The multiphase armature windings are respectively wound around the plurality of teeth. Then, in all of the hollow parts of a second layer and subsequent layers other than the hollow part of a first layer which is at a position farthest from the rotation axis of the rotor core, the conductor bars are disposed at both end portions thereof close to the bridge at a predetermined distance from the bridge.

Hereinafter, a synchronous reluctance type rotary electric machine of an embodiment will be described with reference to the drawings.

Figure 1:
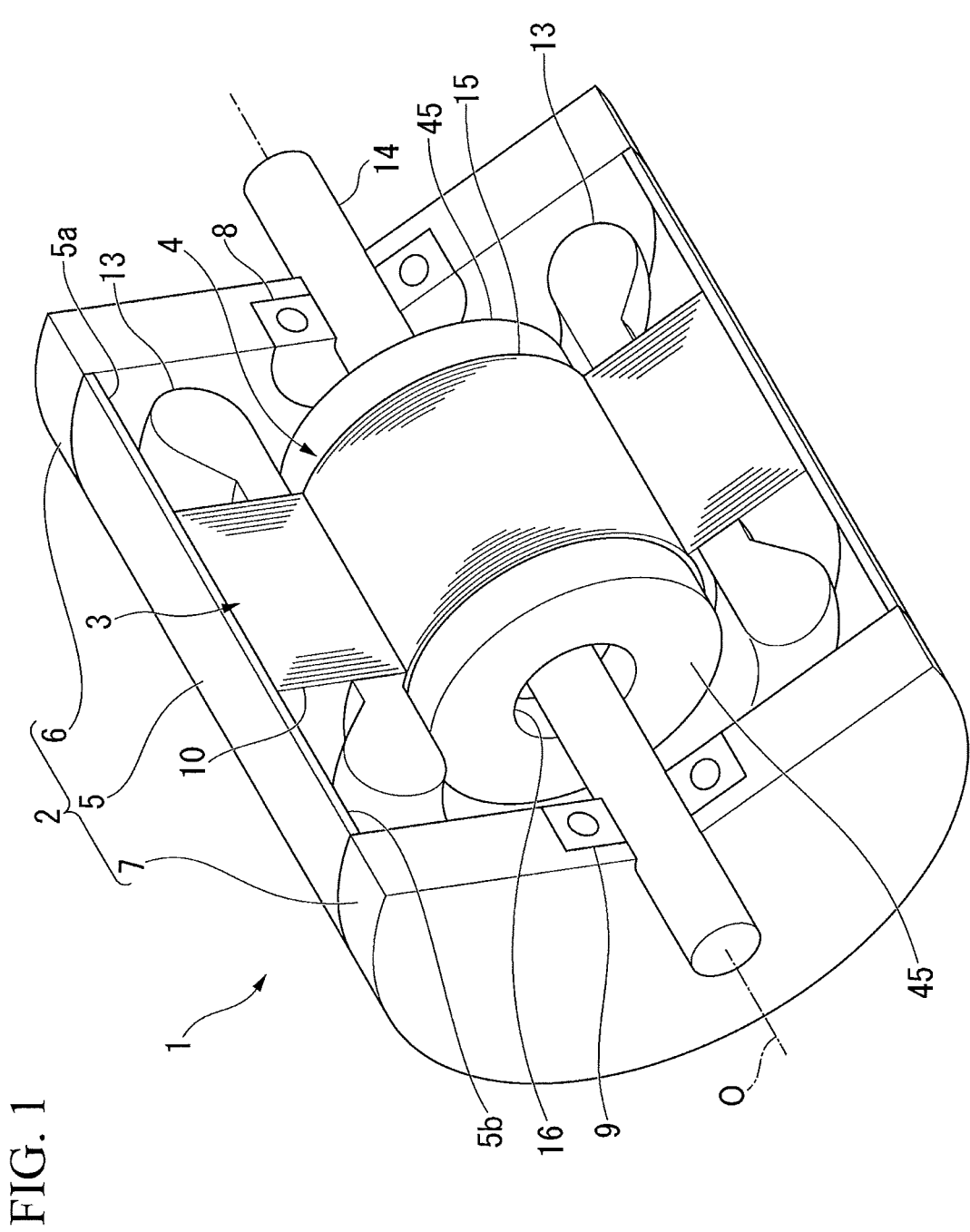
FIG. 1 is a partial cross-sectional perspective view showing a synchronous reluctance type rotary electric machine according to an embodiment.

FIG. 1 is a partial cross-sectional perspective view illustrating a synchronous reluctance type rotary electric machine (hereinafter simply referred to as a rotary electric machine) 1.

As shown in FIG. 1, the rotary electric machine 1 includes a housing 2, a stator 3 fixed in the housing 2, and a rotor 4 supported to be rotatable around a rotation axis O in the housing 2. In the following description, a direction parallel to the rotation axis O will be simply referred to as an axial direction, a direction of revolving around the rotation axis O will be simply referred to as a circumferential direction, and a radial direction perpendicular to the rotation axis O will be simply referred to as a radial direction.

The housing 2 includes a substantially cylindrical frame 5 and bearing brackets 6 and 7 which close openings 5a and 5b at both ends in the axial direction of the frame 5. Each of the bearing brackets 6 and 7 is formed in a substantially disc shape. Bearings 8 and 9 for rotatably supporting the rotor 4 are respectively provided substantially at centers in the radial direction of the bearing brackets 6 and 7.

Figure 2:
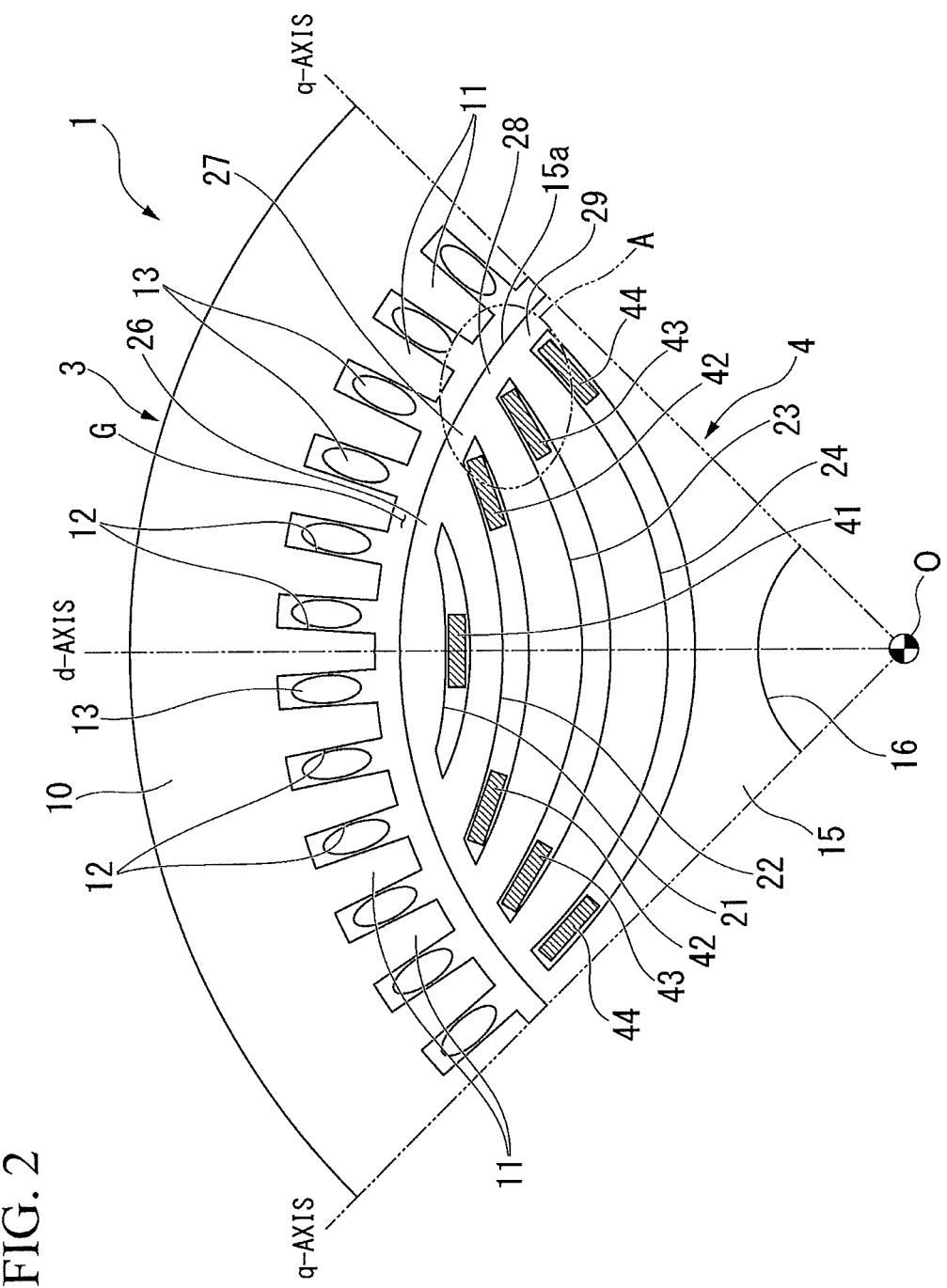
FIG. 2 is a cross-sectional view perpendicular to a rotation axis showing a configuration of a portion of the rotary electric machine of the embodiment.

FIG. 2 is a cross-sectional view perpendicular to the rotation axis O illustrating a configuration of a portion of the rotary electric machine 1. In FIG. 2, a quarter sector of the rotary electric machine 1, that is, only a quarter-circumference circumferential angular region is shown.

As shown in FIGS. 1 and 2, the stator 3 includes a substantially cylindrical stator core 10. An outer circumferential surface of the stator core 10 is internally fitted and fixed to an inner circumferential surface of the frame 5. A radial center of the stator core 10 coincides with the rotation axis O.

Also, the stator core 10 can be formed by laminating a plurality of electromagnetic steel sheets or by compression-molding a soft magnetic powder. On an inner circumferential surface of the stator core 10, a plurality of teeth 11 protruding toward the rotation axis O and disposed at regular intervals in the circumferential direction are integrally molded. The teeth 11 are formed to have a substantially rectangular cross section. A plurality of slots 12 and the plurality of teeth 11 are formed at regular intervals in the circumferential direction so that one slot 12 is disposed between the adjacent teeth 11. Through these slots 12, armature windings 13 are wound around each of the teeth 11.

Figure 3:
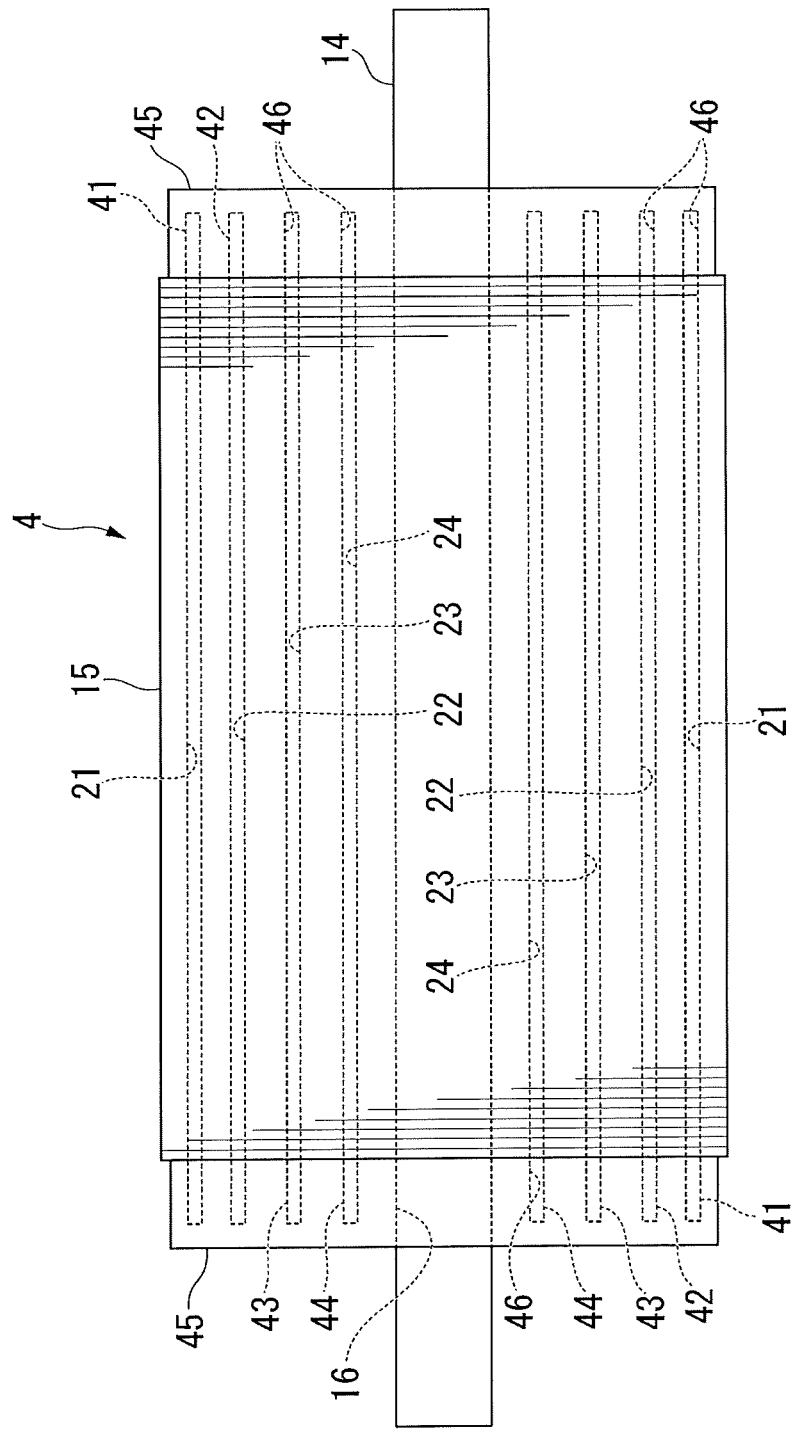
FIG. 3 is a side view showing a rotor of the embodiment.

FIG. 3 is a side view illustrating the rotor 4.

As shown in FIGS. 1 to 3, the rotor 4 is disposed on a side radially inward from the stator core 10. The rotor 4 includes a rotating shaft 14 extending in the axial direction and a substantially columnar rotor core 15 externally fitted and fixed to the rotating shaft 14.

The rotor core 15 can be formed by laminating a plurality of electromagnetic steel sheets or by compression-molding a soft magnetic powder. An outer diameter of the rotor core 15 is set such that a predetermined air gap G is formed between the rotor core 15 and each of the teeth 11 facing each other in the radial direction. Also, a through hole 16 penetrating in the axial direction is formed at a radial center of the rotor core 15. The rotating shaft 14 is press-fitted or the like to the through hole 16, and thereby the rotating shaft 14 and the rotor core 15 rotate integrally.

Further, four layers of hollow parts (flux barriers) 21, 22, 23, and 24 (a first hollow part 21, a second hollow part 22, a third hollow part 23, and a fourth hollow part 24) are formed to be aligned in the radial direction in each of the quarter-circumference circumferential angular regions of the rotor core 15. That is, the first hollow part 21 is formed on an outermost side in the radial direction, and the second hollow part 22, the third hollow part 23, and the fourth hollow part 24 are aligned in this order from the first hollow part 21 toward the side radially inward. Thus, the fourth hollow part 24 is disposed on the side furthest inward in the radial direction.

Also, each of the hollow parts 21 to 24 is formed to follow a flow of a magnetic flux formed when the armature windings 13 are energized. That is, each of the hollow parts 21 to 24 is formed to be curved so that a center thereof in the circumferential direction is positioned furthest inward in the radial direction (to have a convex shape toward the side radially inward). Thereby, a direction in which the magnetic flux easily flows and a direction in which the magnetic flux does not easily flow are formed in the rotor core 15. In the following description, a longitudinal direction of each of the hollow parts 21, 22, 23, and 24 when viewed from a direction of the rotation axis O (a substantially lateral direction in FIG. 2) will be simply referred to as a longitudinal direction of the hollow parts 21, 22, 23, and 24 in some cases.

Here, in the present embodiment, a direction in which the magnetic flux easily flows is referred to as a q-axis. Also, a direction in the radial direction that is electrically and magnetically perpendicular to the q axis is referred to as a d-axis. That is, each of the hollow parts 21 to 24 forms a multilayer structure in the radial direction along the d-axis.

More specifically, regarding the q-axis direction in the rotor core 15, a direction in which a flow of the magnetic flux is not interrupted by each of the hollow parts 21 to 24 is referred to as the q-axis. That is, a positive magnetic potential (for example, an N pole of a magnet is brought close thereto) is given to an arbitrary circumferential angular position on an outer circumferential surface 15a of the rotor core 15. Also, a negative magnetic potential (for example, an S pole of a magnet is brought close thereto) is given to another arbitrary circumferential angular position shifted by one pole (90 degrees in mechanical angle in the present embodiment) with respect to the positive magnetic potential. When positions of such positive magnetic potential and negative magnetic potential are shifted in the circumferential direction, a direction from the rotation axis O toward an arbitrary position when a majority of the magnetic flux flows is defined as the q-axis. Thus, the longitudinal direction of each of the hollow parts 21 to 24 is the q-axis.

On the other hand, a direction in which a flow of the magnetic flux is interrupted by each of the hollow parts 21 to 24, that is, a direction magnetically perpendicular to the q-axis is referred to as the d-axis. In the present embodiment, a direction parallel to a direction in which two rotor core portions separated into a region close to the rotation axis O and a region away from the rotation axis O by each of the hollow parts 21 to 24 face each other is the d-axis. Also, when the hollow parts 21 to 24 are formed in multiple layers (four layers in the present embodiment) as in the present embodiment, a direction in which the layers overlap is the d-axis. In the present embodiment, the d-axis is not limited to being electrically and magnetically perpendicular to the q-axis and may intersect the q-axis with a certain degree of angular width (for example, a mechanical angle of about 10 degrees) from the perpendicular angle.

As described above, the rotor core 15 is configured to have four poles, and four layers of the hollow parts 21 to 24 are formed for each pole (a quarter-circumference circumferential angular region of the rotor core 15). Thus, one pole is a region between the q-axes. That is, each of the hollow parts 21 to 24 is formed to be curved toward the side radially inward so that each of the hollow parts 21 to 24 on the d-axis direction is positioned furthest inward in the radial direction.

Also, each of the hollow parts 21 to 24 is formed to be curved so that both ends thereof in a longitudinal direction are positioned on outer circumferential portions of the rotor core 15 when viewed from the axial direction. Then, each of the hollow parts 21 to 24 is formed to follow the q-axis as a position thereon becomes closer to the both ends in the longitudinal direction and to be perpendicular to the d-axis as a position thereon becomes closer to a center in the longitudinal direction.

Further, bridges 26, 27, 28, and 29 (a first bridge 26, a second bridge 27, a third bridge 28, and a fourth bridge 29) are respectively formed between the both ends in the longitudinal direction of each of the hollow parts 21 to 24 and the outer circumferential surface 15a of the rotor core 15 in the q-axis direction.

Here, a first conductor bar 41 is inserted into the first hollow part 21 of the uppermost layer among each of the hollow parts 21 to 24 at substantially a center thereof in the longitudinal direction. Also, conductor bars, 42, 43, and 44 (a second conductor bar 42, a third conductor bar 43, and a fourth conductor bar 44) are respectively inserted into the three hollow parts 22, 23, and 24 from the second hollow part 22 which is one layer lower than the first hollow part 21 to the lowermost fourth hollow part 24.

The second conductor bar 42 is inserted into the both ends of the hollow part 22 close to the bridge 27 in the longitudinal direction of the hollow part 22 at a predetermined distance W from the bridge 27.

The third conductor bar 43 is inserted into the both ends of the hollow part 23 close to the bridge 28 in the longitudinal direction of the hollow part 23 at the predetermined distance W from the bridge 28.

The fourth conductor bar 44 is inserted into the both ends of the hollow part 24 close to the bridge 29 in the longitudinal direction of the hollow part 24 at the predetermined distance W from the bridge 29.

Each of the conductor bars 41 to 44 has a substantially rectangular cross-sectional shape perpendicular to the axial direction and is an elongated plate-shaped member. Also, each of the conductor bars 41 to 44 is formed of a nonmagnetic and conductive material such as, for example, an aluminum alloy or a copper alloy. Further, both ends in the axial direction of each of the conductor bars 41 to 44 are formed to protrude from both ends in the axial direction of the rotor core 15. The both ends in the axial direction of each of the conductor bars 41 to 44 are short-circuited by a short-circuit ring 45.

The short-circuit ring 45 is an annular member disposed at both ends in the axial direction of the rotor core 15. As in the conductor bars 41 to 44, the short-circuit ring 45 is formed of a nonmagnetic and conductive material. Specifically, a material of the short-circuit ring 45 is preferably formed of the same material as that of the conductor bars 41 to 44 such as, for example, an aluminum alloy or a copper alloy. However, it is not limited thereto.

On an inner surface on the rotor core 15 side of the short-circuit ring 45, recesses 46 into which the conductor bars 41 to 44 can be inserted are formed at positions corresponding to each of the conductor bars 41 to 44. The conductor bars 41 to 44 are respectively press-fitted or inserted into these recesses 46, and the short-circuit ring 45 and the respective conductor bars 41 to 44 are connected and fixed to each other by fusion or the like.

Further, a method of fixing the short-circuit ring 45 and each of the conductor bars 41 to 44 is not limited to the above-described method. For example, by forming the short-circuit ring 45 as a molded structure, the short-circuit ring 45 and each of the conductor bars 41 to 44 may be fixed when the short-circuit ring 45 is molded.

When the rotary electric machine 1 is driven with such a configuration, a three-phase alternating current is supplied to the armature windings 13 of the stator 3. Then, a magnetic flux is formed in the predetermined teeth 11. Then, the teeth 11 in which the magnetic flux is formed are sequentially switched in a rotation direction (circumferential direction) of the rotor 4 (the formed magnetic flux moves rotationally).

At this time, in an asynchronous state until the rotor 4 in a stopped state rotates in synchronization with the rotational movement of the magnetic flux on the stator 3 side, an induced current is generated in the conductor bars 41 to 44 provided in the rotor core 15. That is, each of the conductor bars 41 to 44 functions as a secondary coil and generates a starting torque for rotating the rotor 4 between the conductor bars 41 to 44 and the stator 3.

Here, since the first conductor bar 41 is disposed at substantially the center in the longitudinal direction of the first hollow part 21, a clearance is formed between the first conductor bar 41 and the first bridge 26. Also, the second conductor bar 42, the third conductor bar 43, and the fourth conductor bar 44 are respectively disposed at the both ends in the longitudinal direction of the corresponding hollow parts 22, 23, and 24 close to the bridges 27, 28, and 29 at the predetermined distance W. Therefore, harmonic magnetic flux due to torque ripple generated in the air gap G between the stator 3 and the rotor 4 does not readily link with each of the conductor bars 41 to 44 and harmonic secondary copper loss does not easily occur.

More specifically, in order to increase the starting torque of the rotary electric machine 1, since the magnetic flux flowing in from the stator 3 needs to be efficiently linked with each of the conductor bars 41 to 44, it is preferable that each of the conductor bars 41 to 44 be disposed as close as possible to the outer circumferential surface 15a of the rotor core 15. On the other hand, when each of the conductor bars 41 to 44 is brought too close to the outer circumferential surface 15a of the rotor core 15, the harmonic magnetic flux is readily linked with each of the conductor bars 41 to 44, and a harmonics current which does not contribute to rotation of the rotor 4 flows. Therefore, a dimension of the predetermined distance W between the second conductor bar 42, the third conductor bar 43, and the fourth conductor bar 44, and the corresponding bridges 27, 28, and 29 is important. Therefore, in the present embodiment, the predetermined distance W is set as follows.

Figure 4:
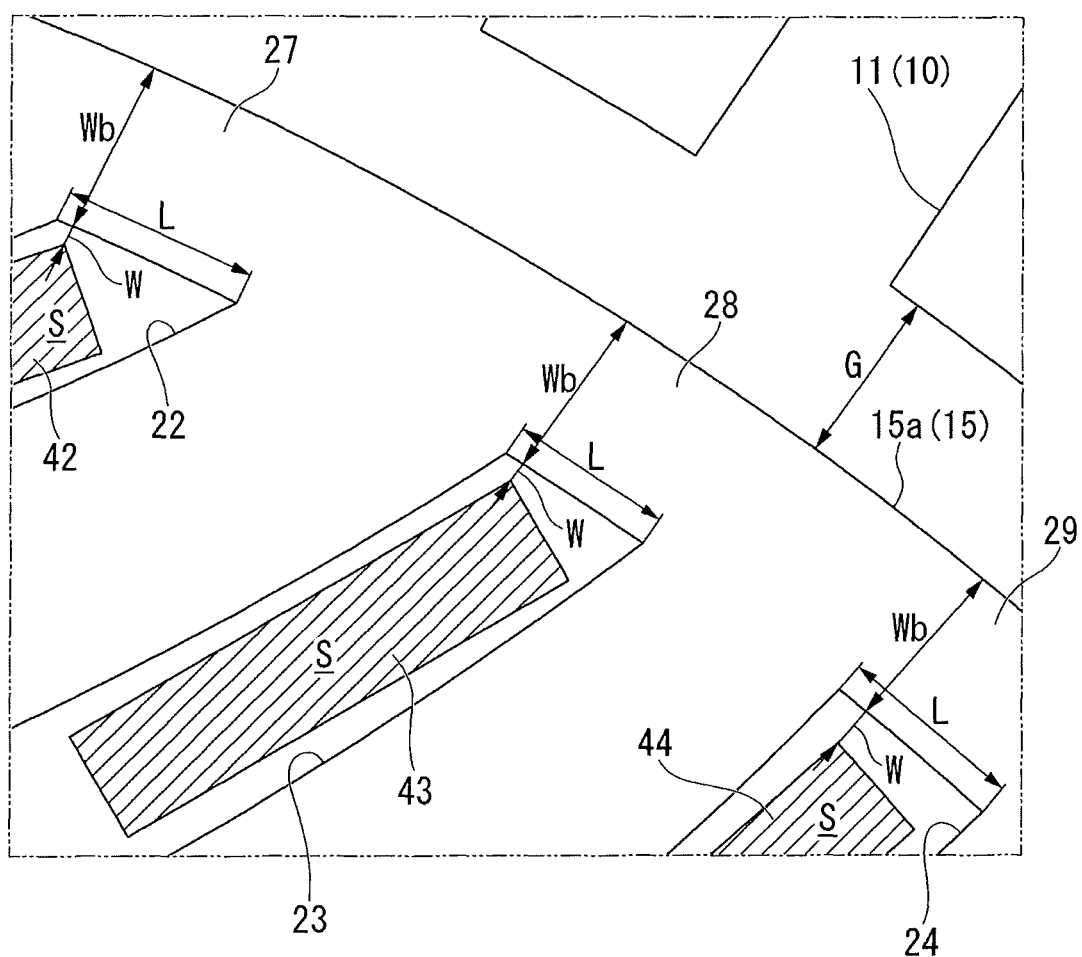
FIG. 4 is an enlarged view of a portion A of FIG. 2.

FIG. 4 is an enlarged view of a portion A of FIG. 2.

That is, as shown in FIG. 4, when a gap between the outer circumferential surface 15a of the rotor core 15 and the stator core 10 (teeth 11) is G (air gap G), a width in a direction along the outer circumferential surface 15a (a width in a direction perpendicular to the radial direction) at the both ends in the longitudinal direction of the hollow parts 22 to 24 (the second hollow part 22, the third hollow part 23, and the fourth hollow part 24) is L, a saturation magnetic flux density of the rotor core 15 is Bs, a thickness of the bridges 27 to 29 (the second bridge 27, the third bridge 28, and the fourth bridge 29) is Wb, a current density of the conductor bars 42 to 44 (the second conductor bar 42, the third conductor bar 43, and the fourth conductor bar 44) is J, a cross-sectional area of the conductor bars 42 to 44 in a direction perpendicular to the rotation axis O is S, and a magnetic permeability of the hollow parts 22 to 24 is μ, the predetermined distance W is set to satisfy $$G < W \leq (L \times Bs \times Wb)/(\mu \times J \times S) \tag{1}$$

Here, the predetermined distance W refers to a distance at a position having a minimum value in each of the distances between the bridges 27 to 29 and the corresponding conductor bars 42 to 44 (refer to a dimension line of W in FIG. 4).

Also, in determining Expression (1), a leakage magnetic flux Φ flowing through the hollow parts 22 to 24 is set as $$\Phi = (\mu \times J \times S \times W)/L \tag{2}$$

and a leakage magnetic flux Φ flowing through the bridges 27 to 29 is set as $$\Phi b = Bs \times Wb \, (Bs \text{ is a saturation magnetic flux density of the rotor core 15}) \tag{3}$$

That is, when the predetermined distance W satisfies Expression (1), the leakage magnetic flux Φ between the bridges 27 to 29 and the conductor bars 42 to 44 is about the leakage magnetic flux Φb flowing through the bridges 27 to 29. As a result, a high starting torque can be obtained while suppressing linkage of the harmonic magnetic flux with each of the conductor bars 41 to 44 as much as possible.

Further, when the predetermined distance W is determined, a cross-sectional area S of the conductor bars 42 to 44 can be calculated on the basis of the above Expression (1) (by inverse operation). Therefore, a range in which the conductor bars 42 to 44 are each disposed at the both ends in the longitudinal direction of the hollow parts 22 to 24 is determined.

As described above, in the above-described embodiment, the conductor bars 42, 43 and 44 are respectively inserted into the three hollow parts 22, 23, and 24 from the second hollow part 22 to the fourth hollow part 24 at the both ends in the longitudinal direction thereof close to the corresponding bridges 27, 28, and 29 at the predetermined distance W between the bridges 27, 28 and 29 and the corresponding conductor bars 41 to 44. Therefore, a driving efficiency of the rotary electric machine 1 can be increased without filling the whole of the hollow parts 22 to 24 with the conductor bars 42 to 44, respectively. Also, since an inverter is not necessary for starting the rotary electric machine 1, the commodity costs of the rotary electric machine 1 can be reduced. Further, since the size of the conductor bars 42 to 44 can be reduced to a minimum, manufacturing costs of the rotary electric machine 1 can also be reduced.

Further, the first conductor bar 41 inserted also in the first hollow part 21 and the conductor bars 42 to 44 are evenly disposed over the entire outer circumferential portion of the rotor core 15. Therefore, the rotary electric machine 1 can obtain a high starting torque.

Also, when the predetermined distance W between the second conductor bar 42, the third conductor bar 43, and the fourth conductor bar 44 and the corresponding bridges 27, 28, and 29 is set to satisfy the above Expression (1), a high starting torque can be obtained while suppressing linkage of the harmonic magnetic flux which does not contribute to the rotation of the rotor 4 with each of the conductor bars 41 to 44 as much as possible. Therefore, the driving efficiency of the rotary electric machine 1 can be more reliably improved.

Figure 5:
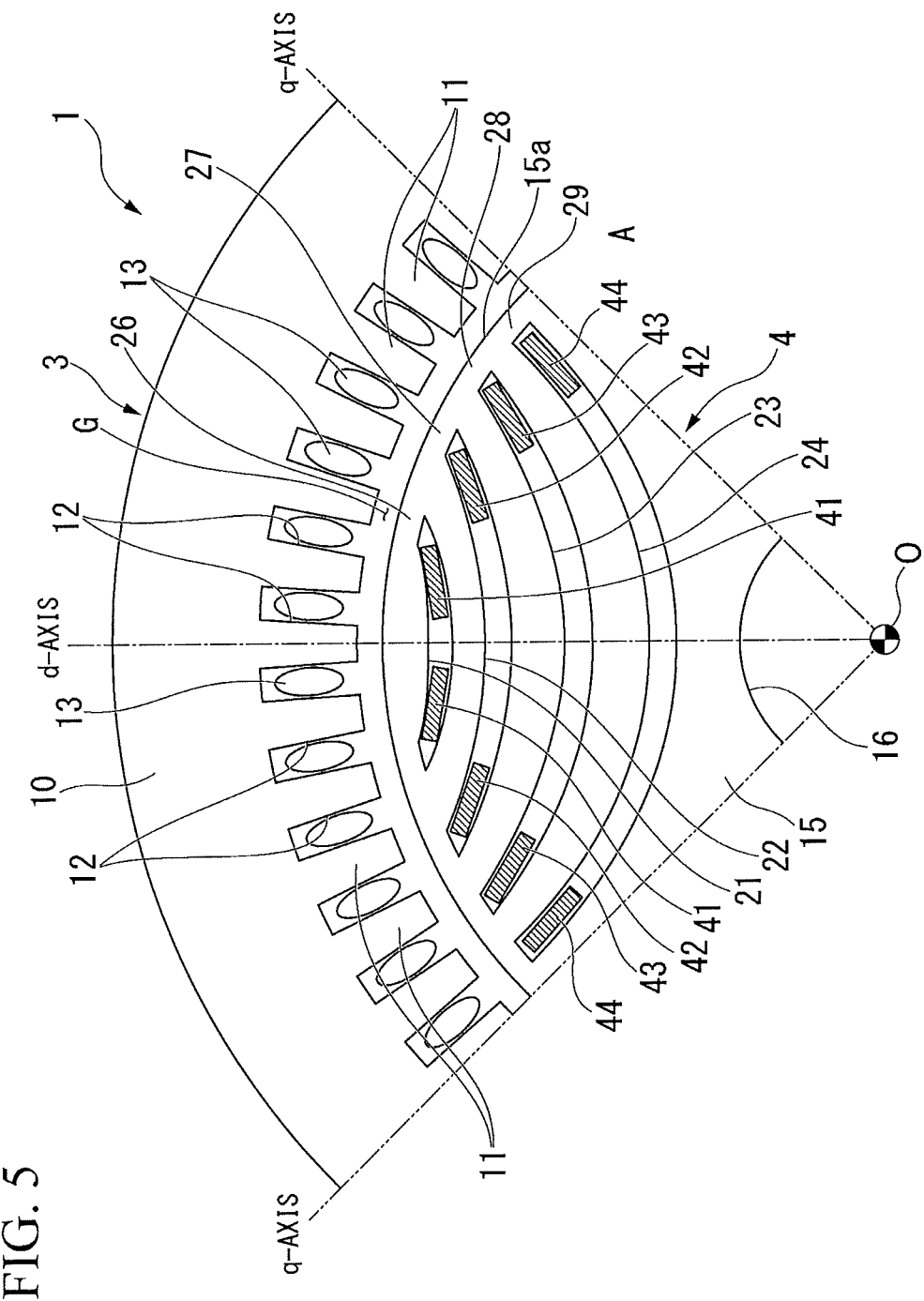
FIG. 5 is a cross-sectional view perpendicular to the rotation axis showing a configuration of a portion of the rotary electric machine of a modified example of the embodiment.

Further, in the above-described embodiment, a case in which the first conductor bar 41 is inserted in substantially the center in the longitudinal direction of the first hollow part 21 has been described. However, it is not limited thereto, and as shown in FIG. 5, the first conductor bar 41 may also be inserted in the both ends in the longitudinal direction of the first hollow part 21 close to the first bridge 26 at the predetermined distance W between the first conductor bar 41 and the first bridge 26 as in the other hollow parts 22 to 24.

Also, in the above-described embodiment, a case in which four layers of the hollow parts 21 to 24 are formed in each of the quarter-circumference circumferential angular region (for each pole) in the rotor core 15 has been described. However, it is not limited thereto, and a plurality of hollow parts of four or more layers may be formed. Also when four or more layers of hollow parts are formed, conductor bars are inserted into each of the hollow parts. Then, regarding at least the hollow parts of the second layer and subsequent layers, the conductor bars are inserted therein at the predetermined distance W from each of the bridges corresponding to the both ends in the longitudinal direction thereof.

Further, in the above-described embodiment, a case in which each of the hollow parts 21 to 24 is formed to be curved so that a center thereof in the circumferential direction is positioned furthest inward in the radial direction (to have a convex shape toward the side radially inward) has been described. However, it is not limited thereto, and each of the hollow parts 21 to 24 need only be formed in a convex shape toward the side radially inward. That is, each of the hollow parts 21 to 24 may not be formed to be curved.

Also, in the above-described embodiment, a case in which the rotor core 15 is configured to have four poles has been described. However, it is not limited thereto, and the rotor core 15 may be configured to have four or more poles.

According to at least any one of the embodiments described above, the conductor bars 42, 43 and 44 are respectively inserted into the three hollow parts 22, 23, and 24 from the second hollow part 22 to the fourth hollow part 24 at the both ends thereof in the longitudinal direction close to the corresponding bridges 27, 28, and 29 at the predetermined distance W from the bridges 27, 28 and 29. Therefore, the driving efficiency of the rotary electric machine 1 can be increased without filling the whole of the hollow parts 22 to 24 with the conductor bars 42 to 44, respectively. Also, since an inverter is not necessary for starting the rotary electric machine 1, the commodity costs of the rotary electric machine 1 can be reduced. Further, since the size of the conductor bars 42 to 44 can be reduced to a minimum, manufacturing costs of the rotary electric machine 1 can also be reduced.

Further, the first conductor bar 41 inserted also in the first hollow part 21 and the conductor bars 42 to 44 are evenly disposed over the entire outer circumferential portion of the rotor core 15. Therefore, the rotary electric machine 1 can obtain a high starting torque.

Further, when the predetermined distance W between the second conductor bar 42, the third conductor bar 43, and the fourth conductor bar 44 and the corresponding bridges 27, 28, and 29 is set to satisfy the above Expression (1), a high starting torque can be obtained while suppressing linkage of the harmonic magnetic flux which does not contribute to the rotation of the rotor 4 with each of the conductor bars 41 to 44 as much as possible. Therefore, the driving efficiency of the rotary electric machine 1 can be more reliably improved.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A synchronous reluctance type rotary electric machine comprising:

a rotor core provided to be rotatable around a rotation axis, and including multi-layered hollow parts having a convex shape toward a side radially inward formed for each pole in cross section, and a bridge formed between each of the hollow parts and an outer circumferential surface thereof along the outer peripheral surface;

a plurality of conductor bars disposed in the respective hollow parts and extending in an axial direction and over approximately entire length of the rotor core;

short-circuit rings provided at both ends of each of the plurality of conductor bars and connecting the plurality of conductor bars together;

a stator core disposed on an outer circumference of the rotor core to be spaced apart from the rotor core and including a plurality of teeth disposed at intervals in a circumferential direction; and multipole multiphase armature windings respectively wound around the plurality of teeth, wherein in all of the hollow parts of a second layer and subsequent layers other than the hollow part of a first layer which is at a position farthest from the rotation axis of the rotor core, the conductor bars are disposed at both end portions thereof close to the bridge at a predetermined distance from the bridge.

2. The synchronous reluctance type rotary electric machine according to claim 1, wherein when a predetermined distance between the bridge and the conductor bar is W, a gap between an outer circumferential surface of the rotor core and the stator core is G, a width in a direction along the outer circumferential surface at the both end portions of the hollow part is L, a saturation magnetic flux density of the rotor core is Bs, a thickness of the bridge is Wb, a current density of the conductor bar is J, a cross-sectional area of the conductor bar in a direction perpendicular to the rotation axis is S, and a magnetic permeability of the hollow part is $\mu$, the predetermined distance W is set to satisfy $$G < W \leq (L \times Bs \times Wb)/(\mu \times J \times S).$$

\* \* \* \* \*